3 Sheets—Sheet 1.

M. RUNSTETLER.
Corn-Planter.

No. 226,116. Patented Mar. 30, 1880.

Witnesses
Fred G. Dieterich
Albert H. Krause

Inventor
Michael Runstetter
by W. B. Richards
Attorney

N. PETERS, PHOTO-LITHOGRAPHER, WASHINGTON, D. C.

M. RUNSTETLER.
Corn-Planter.

No. 226,116  Patented Mar. 30, 1880.

Witnesses
Fred G. Dietrich
Albert H. Krause

Inventor
M. Runstetler
W. B. Richards
by Attorney

3 Sheets—Sheet 3.

M. RUNSTETLER.
Corn-Planter.

No. 226,116

Patented Mar. 30, 1880.

Witnesses
Fred G. Dieterich
Albert H. Krause

Inventor
Michael Runstetler
by W. B. Richards
atty

N. PETERS, PHOTO-LITHOGRAPHER, WASHINGTON, D. C.

UNITED STATES PATENT OFFICE.

MICHAEL RUNSTETLER, OF DAYTON, OHIO, ASSIGNOR TO FARMERS' FRIEND MANUFACTURING COMPANY, OF SAME PLACE.

CORN-PLANTER.

SPECIFICATION forming part of Letters Patent No. 226,116, dated March 30, 1880.

Application filed January 10, 1880.

*To all whom it may concern:*

Be it known that I, MICHAEL RUNSTETLER, of Dayton, in the county of Montgomery and State of Ohio, have invented certain new and useful Improvements in Corn-Planters; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1:
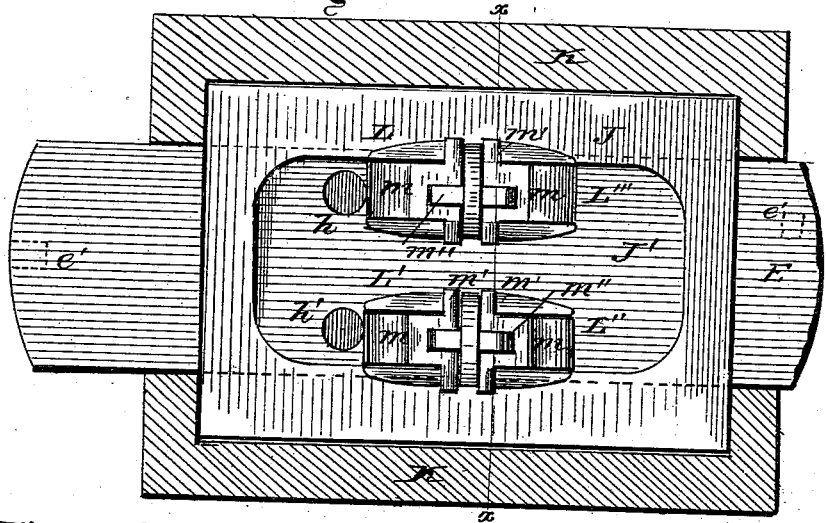
Figure 2:
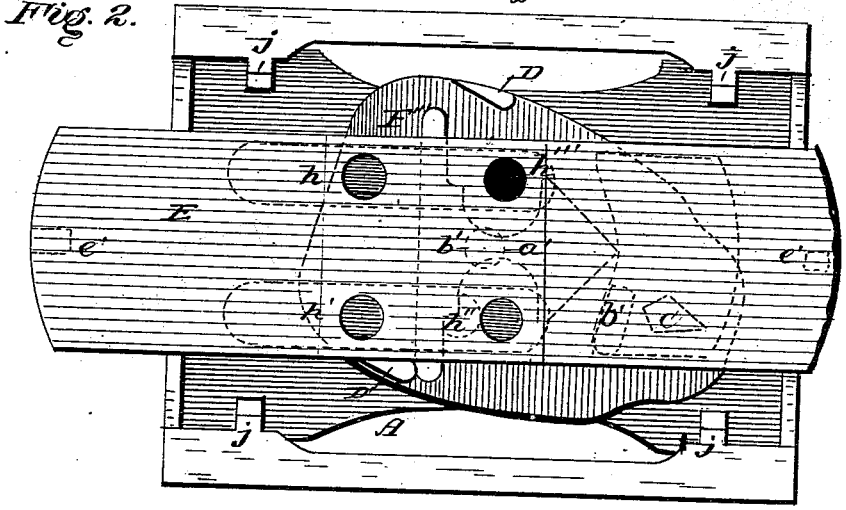
Figure 3:
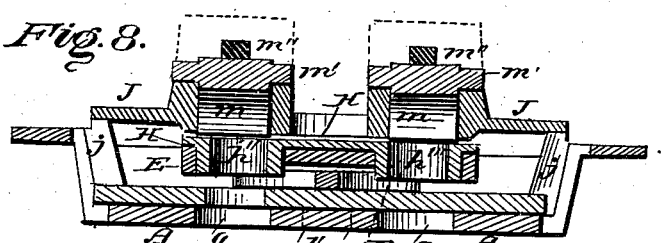
Figure 3:
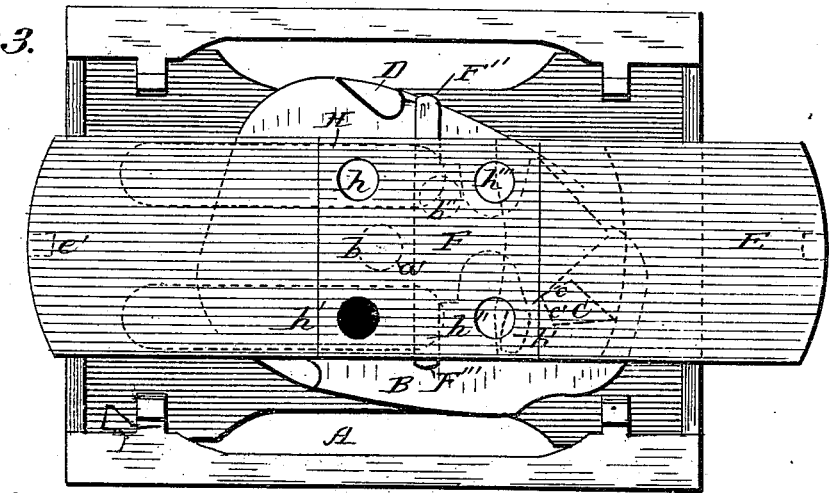
Figure 4:
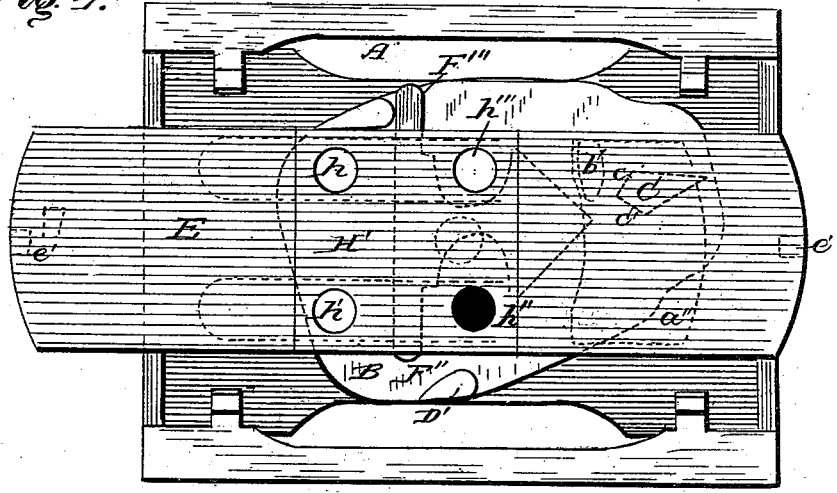
Figure 5:
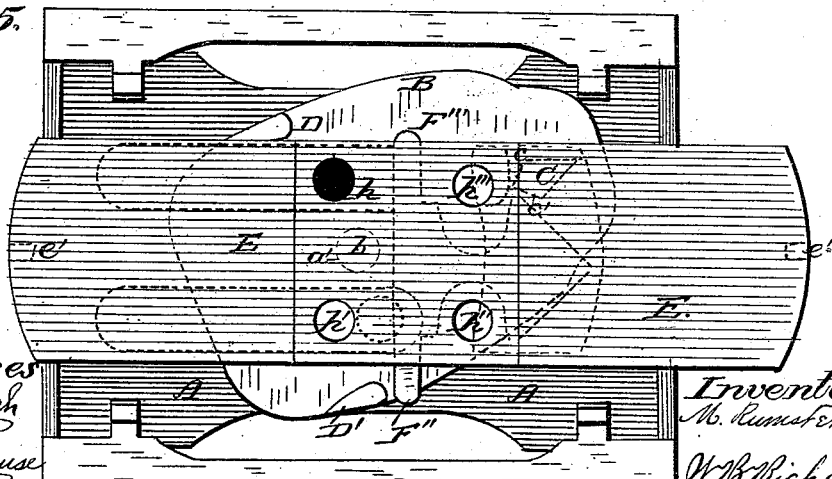
Figure 6:
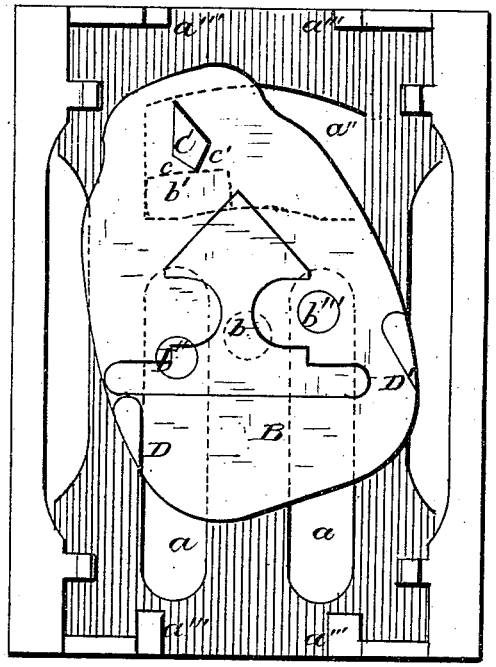
Figure 7:
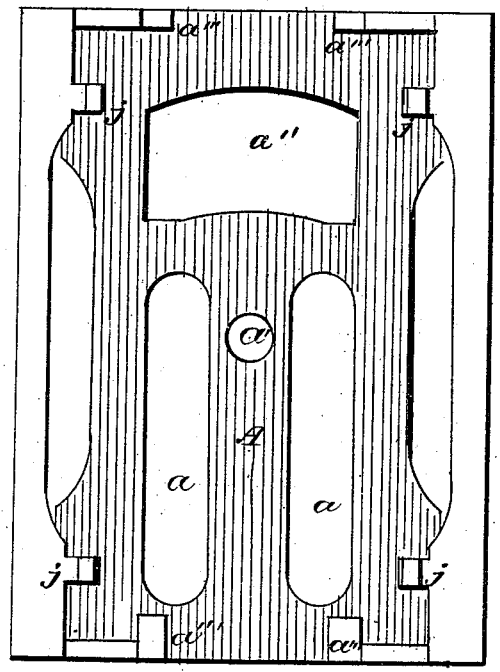
Figure 9:
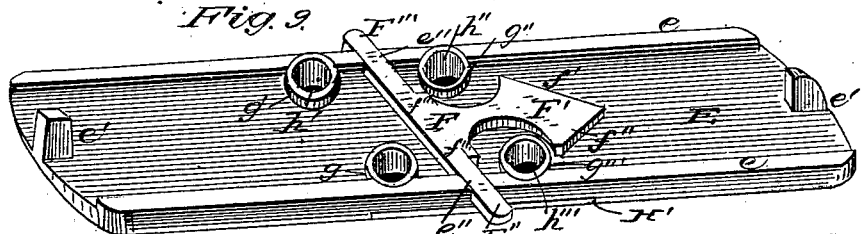
Figure 10:
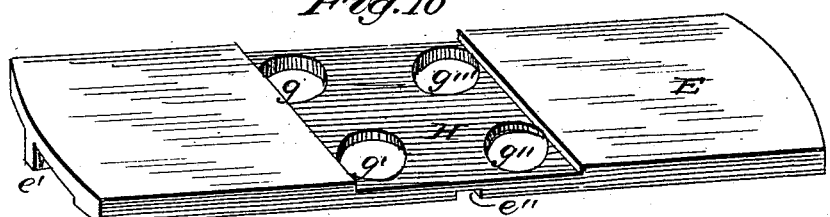
Figure 11:
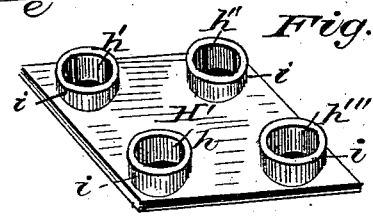

Figure 1 is a top plan of seed-measuring devices embodying my invention, the seed-box shown broken away. Fig. 2 is a top plan, showing the cap-plate and cut-off removed. Fig. 3 is a plan, same as Fig. 2, but the parts shown in different relative positions. Fig. 4 is a plan, same also as Figs. 2 and 3, but the working parts in different relative positions. Fig. 5 is a plan, same as Figs. 2, 3, and 4, but the working parts shown in different relative positions. Fig. 6 is a plan, showing the cap, cut-off, and slide removed, the other parts in same relative positions as at Fig. 4. Fig. 7 is a top plan of the bottom plate. Fig. 8 is a transverse sectional elevation in the line $xx$ in Fig. 1. Fig. 9 is a perspective view of the slide bottom side up, the seed-cup plate and sliding cam in place. Fig. 10 is a perspective view of the slide alone, top side upward. Fig. 11 is a perspective view, bottom side upward, of a substitutive seed-cup plate.

This invention relates to that class of corn-planter seed measuring and delivering devices known as the "slide-drop," in which the seed-cups are in a slide which is reciprocated across the bottom of the seed-box. In planters of this class as heretofore constructed each seed-cup was drawn from beneath the cut-off once by one throw of the slide, and returned beneath the cut-off to discharge its contained seed by the next throw of the slide, and as a result the seed-cups did not fill uniformly with seed.

The main object of my invention is to cause each seed-cup to pass from beneath the cut-off twice and return beneath it twice before discharging its contained seed, thus starting and stopping each seed-cup four times before discharging, which number of starts and stops will settle the seed into the seed-cups and insure uniformity of filling.

My invention consists in constructions and combinations hereinafter described, and set forth in the claims hereto annexed.

Referring to the drawings by letters, letter A represents the bottom plate of an ordinary corn-planter seed-box with slots $a$ $a$, which open into the throat of an ordinary seed-tube, and with suitable recesses and median groove for the reception of the working parts, hereinafter described. B is an oscillating valve, with a stud, $b$, projecting downward from its under side and journaled in a hole, $a'$, in the bottom A, as shown by dotted lines at Figs. 2, 3, 4, and 5 of the drawings. The oscillations of the plate B are limited in extent by a lug, $b'$, which projects downward from its under side into a slot, $a''$, in the bottom A, as shown also by dotted lines at same figures.

The valve B has two seed-openings, $b''$ $b'''$, which are at all times over the slots $a$. At one end of the valve B a cam-lug, C, projects upwardly, with cam-faces $c$ $c'$, and at its other end cam-lugs D D′ project upwardly, one at each side of the valve.

E is a slide, to which a longitudinal reciprocating motion may be given by any means common to corn-planters. The slide E has a ledge, $e$, along each of its sides at its bottom, which slide on ways $a'''$ at the ends of the bottom A, so that the ledges $e$ are close to but preferably not quite touching the valve B. Lugs $e'$ at the end of the slide strike the bottom A and limit the throws of the slide.

F is a T-shaped sliding cam or knocker, with an arrow-head-shaped main stem, F′, having cam-faces $f'$ $f''$, and with lateral arms F″, having shoulders $f'''$. The sliding cam F lies between the slide E and valve B, with its arms F″ projecting laterally through grooves $e''$ in the ledges $e$ of the slide, (see Fig. 9 of the drawings,) and the shoulders $f'''$ on the arms F″, striking the ledges $e$, limit the lateral movements of the sliding cam F when in operation.

The slide E has four holes, $g$ $g'$ $g''$ $g'''$, arranged as shown in the drawings, (see Figs. 8 and 10,) and has a broad transverse groove, H, across its upper side, in which a seed-cup plate, H', may be seated, (see Fig. 10,) which embraces all of the holes $g\ g'\ g''\ g'''$, and which has holes or seed-cups $h\ h'\ h''\ h'''$, with projecting annular flanges $i$, (see Fig. 11,) which extend downward through the holes $g\ g'\ g''\ g'''$, respectively, as shown at Fig. 9 of the drawings. Substitutive seed-cup plates H', with holes or seed-cups of different capacities, may be used for regulating the number of grains in the charges of seed.

J is a cap-plate fitting the interior of the seed-box K, and is supported closely above the slide E by lugs $j$, which project upwardly from the bottom A. The central part, J', of the plate J is cut away to permit the seed in the box K to enter the seed-cups in the slide when the cups are drawn from beneath the cut-offs.

There are four cut-offs, L L' L'' L''', each formed of an ordinary plate, $m$, hinged by trunnions $m'$ at one end, so that their other ends can be raised and lowered, and each held down with a yielding force by a spring, $m''$. The cut-offs are arranged, as shown at Fig. 1 of the drawings, with the two L L' having their free ends in opposite directions from the two L'' L''', and so that when the slide E is given its throw to the left-hand the seed-cups $h\ h'$ will pass from beneath the cut-offs L L' and the seed-cups $h''\ h'''$ pass under the cut-offs L'' L''', and when the slide is given its throw in the opposite direction the seed-cups $h\ h'$ will pass beneath the cut-offs L L' and the seed-cups $h''\ h'''$ pass from beneath the cut-offs L'' L'''.

In describing the operation, I will suppose that the sliding cam F is in such position that when the slide E is moved to make its throw toward the left hand the arm F'' will come in contact with the cam-lug D' and oscillate or vibrate the valve B to the position shown at Fig. 2 of the drawings, and thus bring the seed-cup $h'''$ to register with the hole $b''$ in the valve B, beneath the cut-off L''', and discharge its contained seed to the seed-tube. As the slide E now makes its throw toward the right hand the cam-face $f''$ of the sliding cam F will strike the cam-face $c$ of the cam-lug C and force the cam F over to the position shown by dotted lines at Fig. 3 of the drawings, and at the same time bring the seed-cup $h'$ to register with the hole $b'''$ in the valve B, beneath the cut-off L', and discharge its contained seed.

The throw of the slide last described will not move the valve E, which is held from movement in one direction by the cam-face $f'''$ resting against the cam-lug C, and from movement in the opposite direction by the cam-lug D' resting against the side of the slide E. As the slide E is now moved to make another throw toward the left hand, the arm F''' will act on the cam-lug D and oscillate the valve B to the position shown at Figs. 4 and 6 of the drawings, and thus bring the seed-cup $h''$ to register with the hole $b'''$ beneath the cut-off L'', and to discharge its seed. As the slide E is now moved again toward the right hand the cam-face $f'$ of the cam F will strike the cam-face $c'$ of the lug C and force the sliding cam F over to the position shown at Fig. 5 of the drawings, while the valve B remains stationary, and thus bring the seed-cup $h$ again to register with the hole $b''$ in the valve B and discharge its seed beneath the cut-off L. The last-described movement brings the parts into position again for making the throw of the slide E toward the left hand, as hereinbefore first described.

At Fig. 5 the valve B is shown as locked against oscillation by the lugs D and C.

It will be seen from the foregoing that each seed-cup hole is stopped and started four times, and passes from beneath the cut-off and returns twice before discharging its seed, and it will be evident that the slight jarring arising from stopping and starting the slide so often will settle the seed into and insure greater uniformity in filling the seed-cups.

The slide E may have the seed-cup holes formed in it, if preferred, and the plate H' be dispensed with.

The seed-cup holes may be formed in groups of two or more in the slide, instead of singly, so as to discharge greater quantities of seed, if desired.

Motion may be communicated to the oscillating valve B differently from the manner which I have described, and hence I do not desire to be understood as limiting my claims to the oscillating valve when actuated by the sliding cam F.

What I claim as new, and desire to secure by Letters Patent, is—

1. In combination with a corn-planter seed-slide having holes $g\ g'\ g''\ g'''$ and a groove, H, the substitutive plate H', having seed-cups with projecting flanges $i$, adapted to enter the holes in the slide, substantially as and for the purpose specified.

2. The combination, with a reciprocating slide having seed-cup holes, of an oscillating valve located beneath the slide and adapted to allow the seed-cups in the slide to discharge successionally, one at each throw of the slide.

3. The combination, with a slide having seed-cup holes and an oscillating valve below the slide, of a sliding cam located between the seed-cup slide and the oscillating valve and adapted to transmit an oscillating motion to the valve from the reciprocating motion of the slide, whereby the oscillating valve is made to close at every throw of the slide all of the seed-cup holes in the slide except the hole which discharges.

4. The combination, with a slide having seed-cup holes and an oscillating valve below it, of a sliding cam adapted to move laterally and longitudinally and to vibrate or oscillate the valve at every alternate throw of the slide.

5. The sliding cam F, having arms F'' F''' and cam-faces $f'\ f''$, in combination with the slide E, having series of seed-cups $h\ h'\ h''\ h'''$ and notches or guides $e''$, and the oscillating valve B, having holes $b''$ $b'''$, and cam-lugs D, D', and C, substantially as and for the purpose specified.

6. In combination with a slide having seed-cups and an oscillating valve beneath said slide, a sliding cam, F, having cam-faces $f''$ $f'''$, adapted to coact with a cam-lug, C, on the oscillating valve for giving a lateral motion to the sliding cam F, substantially as and for the purpose specified.

7. In combination with a slide having seed-cups and a sliding cam, F, having arms F'' F''', an oscillating valve, B, having lugs D D', which coact with the arms F'' F''' to impart an oscillating motion to said valve, substantially as and for the purpose specified.

8. In combination with a slide having seed-cups and a sliding cam, F, an oscillating valve, B, having a stop-lug, $b'$, arranged to limit the throws of the valve by contact with the sides of a slot in the bottom plate, A, substantially as and for the purpose specified.

9. The combination, with a slide having seed-cups and an oscillating valve, B, of a sliding cam, F, having arms F'' F''', with shoulders $f''''$, for limiting the extent of the lateral throws of the sliding cam F, substantially as described, and for the purpose specified.

10. In a corn-planting machine, the combination, with the slide having four seed-cup holes and an oscillating valve having two holes, $b''$ $b'''$, of a sliding cam adapted to bring the seed-cup holes in the slide to register with the holes in the oscillating valve, substantially as and for the purpose specified.

In testimony that I claim the foregoing as my own I affix my signature in presence of two witnesses.

MICHAEL RUNSTETLER.

Witnesses:
GEORGE O. WARRINGTON,
A. H. ROMSPERT.